W. J. A. LONDON.
VERTICAL BEARING.
APPLICATION FILED JULY 24, 1911.
1,157,644.
Patented Oct. 19, 1915.
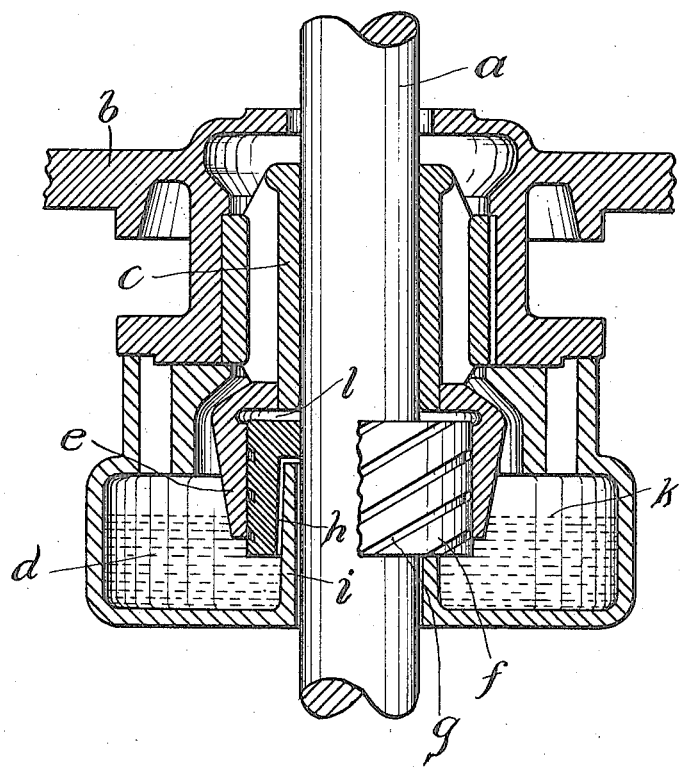
WITNESSES:
Louis Lucia
M. E. O'Neill
INVENTOR.
W. J. A. London.
BY
W. E. Hart
his ATTORNEY.

UNITED STATES PATENT OFFICE.

WILLIAM J. A. LONDON, OF HARTFORD, CONNECTICUT, ASSIGNOR TO THE TERRY STEAM TURBINE COMPANY, OF HARTFORD, CONNECTICUT, A CORPORATION OF CONNECTICUT.

VERTICAL BEARING.

1,157,644.  Specification of Letters Patent.  Patented Oct. 19, 1915.

Application filed July 24, 1911. Serial No. 640,123.

*To all whom it may concern:*

Be it known that I, WILLIAM J. A. LONDON, a subject of the King of England, and a resident of Hartford, in the county of Hartford and State of Connecticut, have invented certain new and useful Improvements in Vertical Bearings, of which the following is a specification.

The object of this invention is to produce a vertical shaft bearing having features of novelty and advantage, and more particularly to provide a bearing of substantial length and stiffness and an oiling device therefor.

The figure of the drawings represents an embodiment of my invention in central vertical section.

*a* denotes the shaft, *b* the housing, *c* the main bearing suitably supported in the housing, *d*, an oil reservoir in the bottom of the housing.

*e* is a hood supported on the lower end of the bearing and within which fits a bushing *f* which is secured to and rotates with the shaft *a* and has on its exterior surface spiral grooves *g*; this bushing is recessed on its underside as indicated at *h* to form a space to receive a sleeve *i* projecting upwardly from the bottom of the housing above the oil level which is indicated by the line *k* to prevent the escape of the oil from the housing. Above the bushing *f* is an oil-pressure chamber *l* the outlet from which is through the bearing. As the shaft rotates the bushing *f* acts as a pump to feed the oil up into the chamber *l* from which its only outlet is through the bearing, escaping at the upper end and returning to the oil reservoir by gravity through suitable passages illustrated.

This invention finds its greatest utility in connection with bearings located along the length of a shaft or spindle, the shaft passing through the housing, and is particularly adapted for use for lubrication of turbine shafts which require very rigid bearings owing to the peculiar strains to which they are subjected.

Although I have shown a plain bearing in the illustration of my invention it will be readily apparent that the structure is equally as useful with other types of bearings.

I claim as my invention:

1. In a vertical bearing, a housing, a bearing mounted therein, a shaft supported in said bearing and extending through the housing, an oil reservoir at the lower part of the housing, an oil pump in said reservoir, and a pressure chamber having its outlet through said bearing and to which said pump delivers oil under pressure.

2. In a vertical bearing, a housing, a bearing mounted therein, a shaft supported in said bearing and extending through the housing, an oil reservoir at the bottom of the housing, an oil chamber below said bearing and having its outlet therethrough, and an oil pump located between said reservoir and chamber and adapted to deliver oil under pressure from the former to the latter.

3. In a vertical bearing, a housing, a bearing mounted therein, a shaft supported in said bearing and extending through said housing, an annular oil reservoir at the lower part of the housing surrounding the shaft, a hood secured to said bearing, a bushing secured to and rotatable with said shaft and closely fitting within said hood, and an oil chamber located between said bushing and bearing and having its outlet through the latter, said bushing having spirally arranged grooves in its exterior surface.

4. The combination in a vertical bearing with a housing, a bearing located therein, and a shaft supported by the bearing and extending through the housing, of an annular oil reservoir located below the housing and surrounding the shaft, the inner wall of said reservoir being adjacent to said shaft, a bushing secured to said shaft and recessed to fit over the inner wall of said reservoir, a stationary hood within said housing within which said bushing fits closely, and a chamber formed in part by said hood beneath and having its outlet through said bearing, the exterior of said bushing being spirally grooved to act as a pump to raise the oil from said reservoir to said chamber.

5. In a vertical bearing lubricator, the combination with a shaft, a bearing therefor and a lubricant reservoir located underneath the bearing and surrounding the shaft, of a force pump with its inlet immersed in the lubricant in said reservoir, and its outlet at said bearing whereby lubricant is forced through said bearing under pressure.

WILLIAM J. A. LONDON.

Witnesses:
ROBERT C. ALLEN,
E. T. FITZ-GERALD.